US005558732A

United States Patent [19]

Hamon

[11] Patent Number: 5,558,732
[45] Date of Patent: Sep. 24, 1996

[54] PROCESS FOR POSITIONING SPACER BEADS IN FLAT DISPLAY SCREENS

[75] Inventor: Olivier Hamon, Voreppe, France

[73] Assignee: Pixel International, Rousset, France

[21] Appl. No.: 363,403

[22] Filed: Dec. 23, 1994

[30] Foreign Application Priority Data

Dec. 30, 1993 [FR] France .................................. 93 16039

[51] Int. Cl.⁶ .............................. B05C 3/20; B05D 1/18; B32B 3/22; B32B 31/12
[52] U.S. Cl. ........................... 156/99; 156/285; 156/292; 156/382; 156/562; 156/569; 156/578; 427/294
[58] Field of Search ............................ 156/99, 285, 292, 156/562, 578, 569, 382; 427/294; 359/81; 428/1, 917

[56] References Cited

U.S. PATENT DOCUMENTS

| | | | |
|---|---|---|---|
| 2,975,822 | 3/1961 | Gent et al. ............................... | 156/552 |
| 4,222,635 | 9/1980 | Jülke ..................................... | 359/81 X |
| 4,362,771 | 12/1982 | Umeda et al. ................................ | 428/1 |
| 4,685,770 | 8/1987 | Baeger .................................. | 156/292 X |
| 4,951,388 | 8/1990 | Eguchi et al. .......................... | 156/578 |
| 4,983,429 | 1/1991 | Takayanagi et al. ....................... | 428/1 |
| 5,232,549 | 8/1993 | Cathey et al. .......................... | 456/633 |
| 5,328,728 | 7/1994 | Swirbel et al. ........................ | 359/81 X |

OTHER PUBLICATIONS

R. Baptist, "Ecrans Fluorescents a Micropointes (Microtips Fluorescent Displays"), L'Onde Electrique, Nov.–Dec., 1991, vol. 71, No. 6, pp. 36–42.

Primary Examiner—Michael W. Ball
Assistant Examiner—Francis J. Lorin
Attorney, Agent, or Firm—Plevy & Associates

[57] ABSTRACT

A process is disclosed for positioning spacer beads on a plate of a flat display screen formed by two adjacent plates constituting a flat air-tight chamber. The method includes providing a hollow needle mounted on a mobile head which is connected to a vacuum/overpressure system. The hollow needle sucks a bead from a bead tank, applies the bead onto a plate covered with an adhesive material to adhere adhesive onto a section of the bead, then removes the bead from the plate. Finally, the needle deposits the bead onto one of the two adjacent plates.

17 Claims, 1 Drawing Sheet

PROCESS FOR POSITIONING SPACER BEADS IN FLAT DISPLAY SCREENS

BACKGROUND OF THE INVENTION

1. Field of the Invention

The present invention relates to a process for positioning spacer beads in flat panel displays such as microtip fluorescent screens, and a system associated with the process.

The present invention generally relates to the manufacturing of display screens comprising two adjacent plates made of glass, quartz or silicon and forming a flat airtight chamber that is subjected to a vacuum, and more particularly relates to the manufacturing of microtip fluorescent screens.

2. Discussion of the Related Art

Flat display screens require the use of spacers for maintaining a predetermined distance between the two plates supporting the electrodes constituting the device. These spacers raise a problem as regards their size (spacers must not De visible) and their implementation.

The microtip fluorescent screens are matrix screens formed by two sealed glass plates constituting a vacuum chamber whose thickness is controlled by spacers. The spacers must overcome the external pressure resulting from the internal vacuum and must provide an even thickness of the airtight chamber between the two plates. A conventional technology used in flat screens (including liquid crystals or plasma panels) provides depositing beads distributed over the whole surface of the screen, the beads having an average diameter equal to the distance between the two plates. In the case of liquid crystal screens, since the beads have a very small diameter (a few μm), they are arbitrarily distributed on this surface. In the case of microtip fluorescent screens (like plasma panels), since the beads have a diameter of the same order of magnitude as the distance between the pixels, they must be accurately positioned at precise places where they have a minimum effect on the operation of the screen, for example, at the intersection of the lines arid columns. Moreover the number of beads must be sufficient so that each bead has a good resistance to external pressure.

In the prior art processes, the distance to be kept between the two plates is generally provided by beads that are distributed over one of the plates and glued thereon before the second plate is mounted. The distribution of the beads is controlled with a frame or an analogous device. Such a technique has many drawbacks. In particular, the positioning of the beads is not accurate which may cause some active portions of the electrodes disposed over the plates to be crushed.

For industrial manufacturing purposes, a process and a system, fast enough to comply with the assembly line requirements, are needed for positioning and depositing the beads.

SUMMARY OF THE INVENTION

An object of the present invention is to avoid the above-mentioned drawbacks while ensuring an accurate positioning and glueing of the beads using a minimum quantity of glue in order to limit the risk of polluting and spoiling the plates and the medium between the two plates.

A further object is to provide an efficient inexpensive and simple process for depositing the glue and the beads in a single step and with a single equipment.

To achieve these objects, the present invention provides a process consisting in depositing on the inner surface of a plate of the screen an array of spacer beads, accurately in register with respect to the elements already formed. The process consists in using a hollow needle mounted on a movable head connected to a vacuum/overpressure system, allowing the hollow needle to suck a bead out of a tank. This bead is then applied on a plate covered with glue before being deposited on the screen plate by exerting an overpressure in the hollow needle.

The foregoing and other objects, features, aspects and advantages of the invention will become apparent from the following detailed description of the present invention when taken in conjunction with the accompanying drawings.

DETAILED DESCRIPTION

Figure 1:
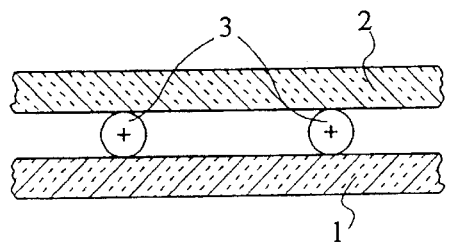
FIG. 1 is a partial cross-sectional view of a flat screen in which the two plates are separated by beads.

FIG. 1 is a very schematic cross-sectional view of a flat panel display, such as a microtip, or plasma screen or other vacuum screen, formed by two plates 1 and 2 made of glass, quartz or silicon supporting active elements defining pixels, the two plates being maintained separated by spacers constituted by beads 3.

Figure 2:
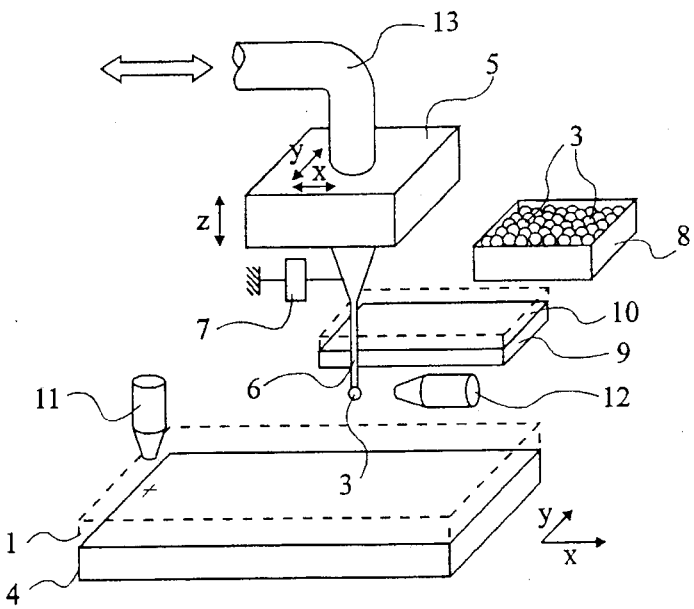
FIG. 2 is a perspective view of a system according to the invention.

FIG. 2 illustrates a device, according to the present invention, for the accurate positioning of beads 3 on one of plates 1 or 2.

Figures 3, 4, 5:
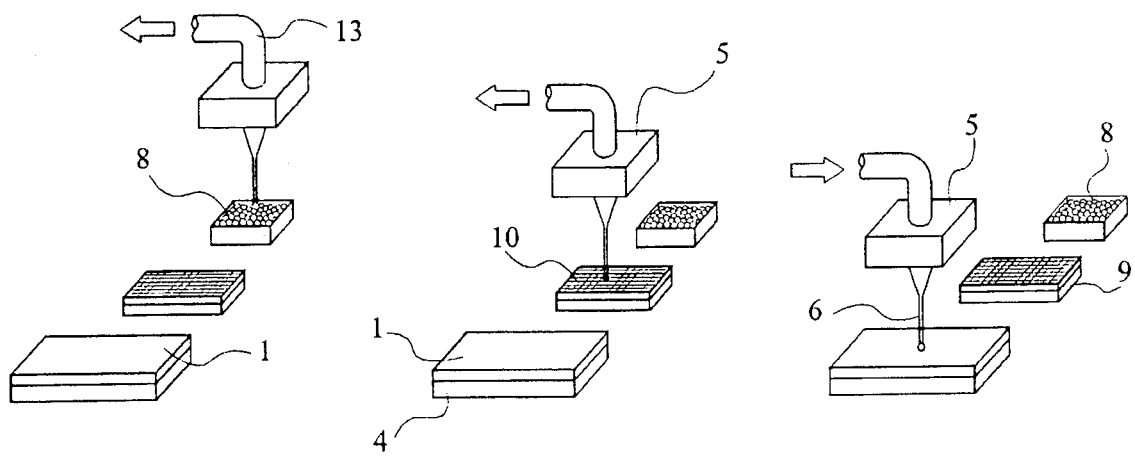
FIGS. 3–5 represent the three successive main phases of a process according to the invention, namely: sucking a bead, glueing, and depositing the bead on the screen plate.

The plate 1 is said on a vacuum support 4 mounted on a programmable micrometric x-y table. A head 5 is mounted on a robot moving along x-y-z and is connected to a switchable and programmable vacuum/overpressure system 13. The head 5 supports a rigid and hollow needle 6 having an inner diameter smaller than the average diameter of the beads to deposit (typical ratio: 3:4). The needle 6 is connected to an ultrasonic piezoelectric transducer 7, which is activated immediately after the aspiration of bead 3, for expulsing beads aggregated to the selected bead by electrostatic attraction. An antistatic bead tank 8 contains a reserve of beads. A vacuum plate support 9 carries a plate 10 covered with glue to which is associated a doctor blade coater. An optical alignment system 11 allows the positioning of the first bead, the positioning of the other beads being programmed with respect to this origin. An image detection system 12, associated with head 5, discards the unsuitable beads 3 in a garbage (not shown) provided for this use. The process consists in depositing on one of the inner surfaces of the screen (generally the rear surface supporting the cathode) an array of beads 3 having a diameter typically ranging from several tens to several hundreds of a μm, and accurately registered to the elements already deposited over plate 1, by means of a needle 6 mounted on a movable head 5 and connected to the vacuum/overpressure system by a tube First, head 5 is positioned perpendicularly to the tank 8 containing the beads (FIG. 3), in which the needle 6 is driven to suck out one bead. Then (FIG. 4) the head 5 is positioned over the plate 10 evenly coated (typical thickness of 1:10 of the diameter of the bead) with a viscous adhesive (having a typical viscosity of 100,000 centipoise); then, the head is lowered so that the bead is soaked with the adhesive coating. Last (FIG. 5) the head 5 is positioned perpendicularly to its final position x-y on plate 1 and lowers the bead to contact the plate. The aspiration is interrupted and a slight overpressure is applied. The bead remains in its position due to the viscosity of the adhesive.

The above steps are repeated for all the beads 3 to be deposited.

The adhesive material can advantageously be a glue cross-linkable through ultra-violet exposure, but other materials can be used, such as glass fusible at low temperature, that may include some metal particles, polymer capable of withstanding high temperatures, and so on. An appropriate process is then applied to ensure the proper holding of the beads on the plate during the subsequent manufacturing steps. The process includes, for example, in the case of cross-linkable glue, exposure to UV rays, drying, or heating with infra-red rays.

Before sealing plates 1 and 2 of the screen, the adhesive material is evaporated at a high temperature under a vacuum or inert atmosphere to exclude any organic particle in the electro-optical medium.

The programmed combination of the motions x-y of head and of the substrate support 4 allows the positioning of beads 3, which provides a very fast motion of the system.

To increase the flow rate, the head can be formed by three elementary heads simultaneously running in front of one of the three units (bead tank 8, glued plate 10, means for depositing the beads on plate 1).

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended to be limiting. The invention is limited only as defined in the following claims and the equivalents thereto.

I claim:

1. A process for positioning spacer beads on a plate of a flat display screen formed by two adjacent plates made of glass, quartz or silicon constituting a flat air tight chamber, including the following steps:

providing a hollow needle mounted on a mobile head which is connected to a vacuum/overpressure system;

sucking a bead from a bead tank;

applying the bead on a plate covered with an adhesive material, thereby adhering an adhesive coating to a section of the bead and then, removing the bead from the plate;

depositing the bead on one of said two adjacent plates; and repeating these operations for all the beads to be deposited.

2. The process of claim 1, including the step of evaporating the adhesive material at a high temperature or under a vacuum or inert atmosphere before sealing the two plates constituting the screen.

3. The process of claim 1, wherein the adhesive material is a viscous glue which is cross-linkable through ultra-violet exposure and has a viscosity close to 100,000 centipoise, the plate (1) being subjected to UV rays once the beads (3) are positioned.

4. A method of affixing a spacer element to a predetermined point on a panel, comprising the steps of:

providing a plurality of spacer elements;

providing a hollow member having a first end and a conduit that extends through said hollow member to said first end;

positioning said first end of said hollow member in close proximity to said plurality of spacer elements;

reducing pressure in said conduit of said hollow member thereby drawing a selected spacer element against said first end;

bringing said selected spacer element in contact with an adhesive coated plate, wherein an adhesive coating adheres to a section of said selected spacer element;

positioning said hollow member over said predetermined point on said panel, wherein said selected spacer element contacts said predetermined point; and separating said selected spacer element from said hollow member.

5. The method according to claim 4, wherein said step of separating said selected spacer element from said hollow member includes increasing pressure in said conduit, thereby biasing said selected spacer element away from said first end and against said predetermined point.

6. The method according to claim 4, further including the step of curing said adhesive coating after said selected spacer element with said adhesive coating is brought into contact with said predetermined point.

7. The method according to claim 4, further including the step of vibrating said hollow member when said selected spacer element is drawn to said first end of said hollow member, thereby dislodging any other spacer elements that may be inadvertently attracted to said selected spacer element by electrostatic forces.

8. The method according to claim 4, further including the steps of:

creating an evacuated environment around said panel after said selected spacer element is placed at said predetermined point; and evaporating excess adhesive disposed between said selected spacer element and said panel.

9. The method according to claim 6, wherein said step of curing said adhesive coating includes exposing said adhesive coating to ultraviolet radiation.

10. The method according to claim 7, wherein said step of vibrating said hollow member includes vibrating said hollow member with an ultrasonic transducer.

11. The method according to claim 4, further including the step of:

returning said hollow member to said plurality of spacer elements;

drawing a second spacer element against said first end of said hollow member;

bringing said second spacer element in contact with the adhesive;

positioning said second spacer element on said panel at a second point determined by the position of said selected spacer element at said predetermined point.

12. The method according to claim 4, further including the step of optically analyzing said selected spacer element and disregarding said selected spacer element if the step of optically analyzing said selected spacer element finds said selected spacer element to be defective.

13. A method of assembling two panels for use in a display, wherein at least one of said panels contains pixel elements disposed in a matrix of rows and columns, said method comprising the steps of:

a) selecting a single spacer element from a supply of spacer elements;

b) applying an adhesive to a section of said single spacer element by bringing said single spacer element in contact with an adhesive coated plate;

c) positioning said single spacer element on at least one of said panels at a position on said matrix between pixel elements;

d) repeating steps (a) through (c) until a predetermined number of spacer elements are disposed on at least one of said panels; and e) curing the adhesive on all of the spacer elements, thereby adhesively binding the spacer elements to at least one of said panels.

14. The method according to claim 13, wherein said spacer elements are spheres.

15. The method according to claim 13, which further includes after said curing step, placing said two panels together, wherein said spacer elements space said two panels at a predetermined distance apart without interfering with said pixel elements.

16. The method according to claim 13, wherein said substep of selecting a single spacer element from a supply of spacer elements includes lowering the pressure in a conduit that is exposed at a point on a surface, thereby drawing said single spacer element to said point on said surface.

17. The method according to claim 16, wherein said substep of selecting a single spacer element from a supply spacer elements, further includes vibrating said surface to remove spacer elements attracted to said single spacer element by electrostatic forces.

* * * * *